United States Patent [19]
Gottlieb

[11] 3,727,001
[45] Apr. 10, 1973

[54] DISPLAY OF MANIFESTATION

[75] Inventor: Milton Gottlieb, Pittsburgh, Pa.

[73] Assignee: Westinghouse Electric Corporation, Pittsburgh, Pa.

[22] Filed: Nov. 12, 1971

[21] Appl. No.: 198,225

[52] U.S. Cl. .......................... 178/7.3 D, 340/173 LS
[51] Int. Cl. ............................................. H04n 5/66
[58] Field of Search ................. 178/7.3 R, 7.3 D, 178/7.5 D; 340/173 LS, 173 LM

[56] References Cited

UNITED STATES PATENTS

| | | | |
|---|---|---|---|
| 3,562,414 | 2/1971 | Blum | 178/7.3 D |
| 3,499,705 | 3/1970 | Baynham et al. | 178/7.3 D |
| 3,637,929 | 1/1972 | Kaminow | 178/7.3 D |

*Primary Examiner*—Richard Murray
*Attorney*—F. H. Henson et al.

[57] ABSTRACT

There is disclosed apparatus and a method for producing a real-time (instantaneous), two-dimensional display of a manifestation which may specifically be a live scene or an image on a transparency or, more generally, a system of signals such as that produced by a phased array radar. A plurality of transducers energized from a radio-frequency electrical source is connected to an opto-acoustic medium, for example a block of quartz, through a linear array of photo-acoustic elements whose impedance can be varied in accordance with the radiation impinging on them. The elements are insulated from each other. The manifestation is scanned linearly and the light from the scanning lines is impinged in sequence on the array of photo-acoustic elements producing a moving acoustic pattern on the opto-acoustic medium. Coherent light from a laser is projected on the medium intermittently in synchronism with the producing of the complete acoustic patterns on the medium to produce a visual display.

9 Claims, 3 Drawing Figures

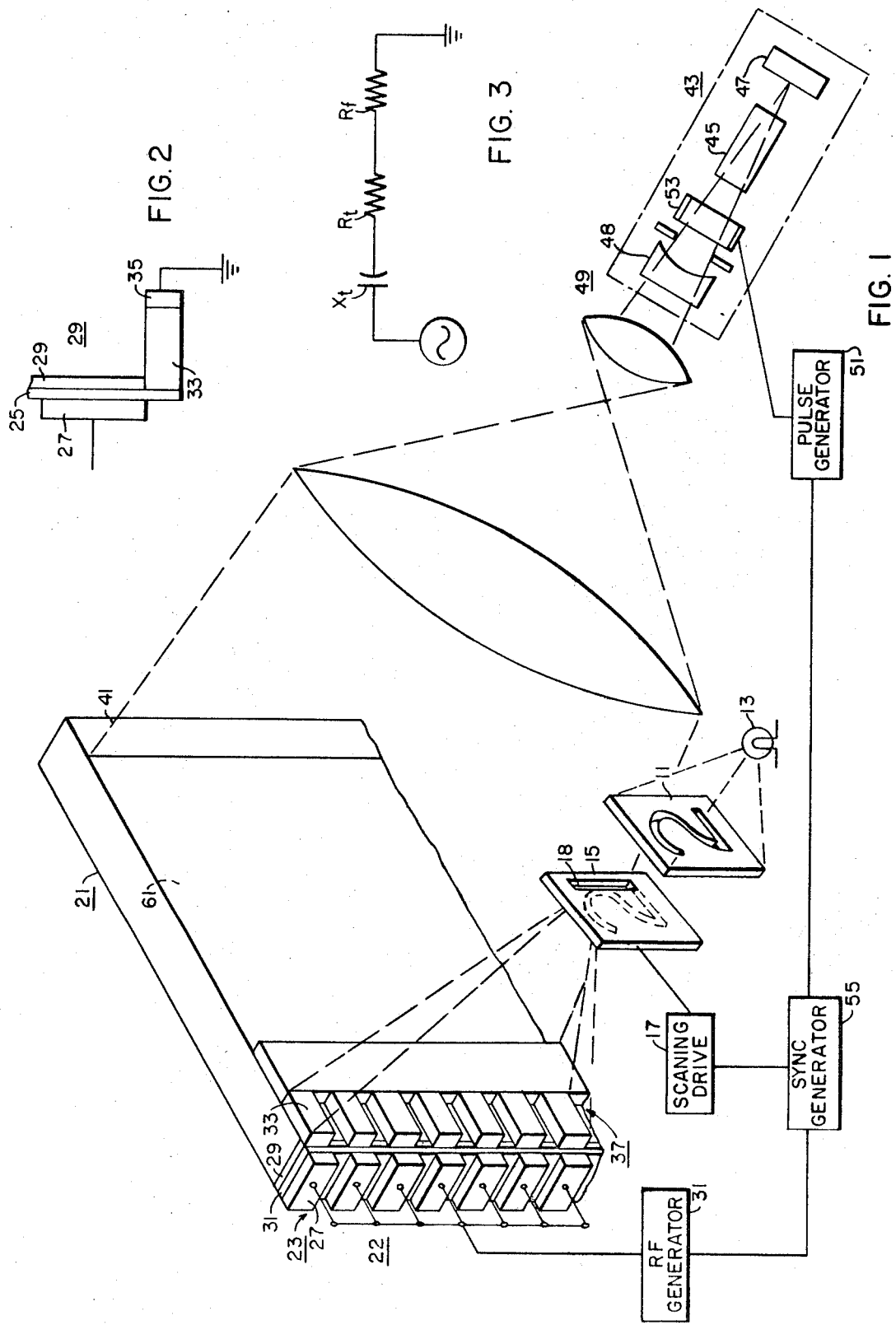

DISPLAY OF MANIFESTATION

BACKGROUND OF THE INVENTION

This invention relates to the display of intelligence, or, what for want of a more descriptive word, is called herein display of manifestation.

The invention has particular relationship to coherent optical processing, or the production of holographic two-dimensional displays or representations of manifestations. Primarily the word "manifestation" is used herein to mean a live scene, person, object or transparency. However, to the extent that this invention may be applied, the word "manifestation" also means herein optical processing to produce two-dimensional displays of symbols or signals such as display of digital or analogue data from a computer or display of the output of a receiver of phased array radar. In the interest of concreteness this application deals predominantly with coherent optical processing of two dimensional transparencies.

Such processing, in accordance with the teachings of the prior art, suffers from the limitations that appreciable time is taken to develop the image on the transparency and the image produced cannot be changed. Photographic film, a most widely used medium in this processing art, takes of the order of one-half second for development and, once developed, is not erasable. To move a photographic film at a high speed to overcome the above deficiencies introduces difficulties in producing the transparencies more serious than the time delay and the non-erasability.

It is an object of this invention to overcome the deficiencies of the prior art and to provide coherent optical processing which shall demand a substantially shorter development time than photographic film; indeed, which for all practical purposes, shall be instantaneous, and in whose practice the image shall be impressed on an erasable medium.

SUMMARY OF THE INVENTION

This invention arises from the realization that the instantaneous acoustic energy flowing into an opto-acoustic medium can be varied to modulate the instantaneous acoustic energy within the medium by varying the impedance, specifically resistance, through which the energy is impressed from a transducer. By so modulating the acoustic energy impressed on the opto-acoustic medium in accordance with the manifestation to be displayed, a continuously changing acoustic pattern may be impressed on the medium. This pattern may be converted into a visual image by projected collimated radiation on the medium and strobing the incident radiation in appropriate synchronism with the changing pattern.

In accordance with this invention an opto-acoustic medium is energized from a high-frequency electrical supply through a plurality of transducers and an array of variable impedance elements whose impedance is variable in accordance with signals impressed thereon. The variable impedance elements are arrayed along the medium and are insulated from each other and are energized in accordance with the manifestation to be imaged or displayed. An element along the opto-acoustic medium is then energized separately through each element and a moving acoustic pattern made up of the acoustic response of the elements of the opto-acoustic medium is produced on the medium. This pattern may be converted into a visual display through the opto-acoustic interaction by impinging on the medium coherent radiation from a laser. It is essential that the length of the medium be limited to avoid overlapping of the elemental parts of the pattern by reason of the acoustic beam diffraction spread from the transducers.

This invention is uniquely applicable to the display of a visible manifestation such as a live scene or a transparency. For this purpose the variable impedance elements are of photoconductive material. Such elements have a resistance which varies in accordance with the light intensity on each. In this case the elements are arrayed linearly, the manifestation is scanned, emitting successive elemental lines of light of varying intensity along the lines dependent on the manifestation, and the lines are successively impinged on the photoconductive elements producing moving acoustic patterns along the medium. The patterns are converted into a display by strobing with coherent radiation.

The invention may also be practiced to reproduce signals visually. In this case, the variable impedance elements along the opto-acoustic medium are voltage sensitive p-n junctions. The impedance of these elements can be varied by impressing on the array of junctions signals derived from the output receivers on phased array radar.

BRIEF DESCRIPTION OF THE DRAWING

For a better understanding of this invention, both as to its organization and as to its method of operation, together with additional objects and advantages thereof, reference is made to the following description, taken in connection with the accompanying drawing, in which:

FIG. 1 is a diagrammatic view of an embodiment of this invention;

FIG. 2 is a diagrammatic view showing a unit through which the opto-acoustic medium is energized or set into acoustic vibration in the practice of this invention; and FIG. 3 is a schematic showing an electrical circuit equivalent of the unit of FIG. 2.

DETAILED DESCRIPTION OF EMBODIMENT

FIG. 1 shows apparatus in accordance with this invention in which the manifestation to be displayed is a transparency 11. The transparency is illuminated by a light-source 13 and scanned by a shutter 15 which is driven by a drive 17. Light from successive lines of the transparency 11 are transmitted through the moving linear slot 18 of the shutter. The shutter 15 is symbolic of an appropriate scanning mechanism, typically a line of light which is deflected along the transparency 11.

The apparatus includes a plate 21 of opto-acoustic material which may be a quartz plate. There is also an array 22 of units 23 connected to the plate for acoustically exciting the plate 21. Each unit 23 includes a transducer 25 such as a piezoelectric crystal or deposited film composed of cadmium sulfide or zinc oxide. Each transducer 25 is provided with conducting electrodes 27 and 29 on its faces. The films 27 and 29 may be vacuum deposited gold layers. The spacings between electrodes 27 and 29 respectively should be equal to the width of the elements 27 and 29. The apparatus includes a radio frequency electrical source 31 through which the transducers 25 are driven in parallel. The source 31 is connected to each transducer through the film 27. A film or element 33 of photoconductive material is connected to each film 29. The photoconductive film 33 is connected to ground through a conductor 35. The photo-conductive films 33 are arrayed in a linear array 37 insulated from each other, each connected separately to transducer 25. Preferably, the space between each element 35 and those adjacent to it should be about equal to the width of an element 35.

The transducers 25 may be combined into a single film. To reduce the acoustic and electrical coupling between photo-conductive elements 33 through a common transducer 25 the film transducer 25 should be divided into sections, each insulated and separated from those adjacent to it.

The slot 18 is focused on the array 37 so that it extends along the array. Light from the successive line elements of the transparency 11 impinge on the photoconductive elements 33 varying their resistance and thus varying the acoustic energy which each element 33 impresses along the plate 21.

The network of FIG. 3 is the electrical equivalent of the unit 23. The capacitance $X_t$ is analogous to the reactance of the transducer, the resistance $R_t$ to its resistance and the resistance $R_f$ to the resistance to ground of the electrode 29 and the photo-conductive element 33. The resistance $R_f$ for each element 33 depends on the light from each scanned line of transparency 11 impinging on the element, and this determines the acoustic excitation of the adjacent region of the plate 21. For each scanned line a linear wave disturbance corresponding to the light intensities of the elements of the scanned line moves out along the plate 21. For each scan of the complete transparency 11 a complete acoustic pattern of the transparency is produced in a short interval, of the order of a few microseconds after each scanning. An acoustic absorber 41 is provided at the end of the plate 21 to suppress reflection of the waves transmitted along the plate 21.

It is desirable that the resistance $R_f$ be of sufficiently low magnitude to transmit adequate power to the plate 21 but not low compared to the resistance $R_t$. In the latter event, random variations in resistance $R_t$ would confuse the image produced on plate 21.

Coherent light for converting the acoustic pattern on plate 21 into a visual image of transparency 11 is provided by a laser 43. The laser 43 includes a lasing medium 45, reflector 47 and semi-reflector 48. The light passed by reflector is collimated by collimater 49. The collimated coherent light is impinged on plate 21 and converts the acoustic pattern into a visual image.

The light from the laser 43 is incident on the plate 21 intermittently in synchronism with the formation of complete frames of the transparency 11 on the plate. The period of the incidence of the light may be equal to or an integral multiple of the period of the formation of the frame but typically should be high, consistent with the use to which the display is put. To achieve this purpose, the laser is pulsed from a pulsing generator 51 connected to an electrode 53 of the laser. The radio frequency generator 31, the scanner drive 17 and the pulse generator 51 are maintained in synchronism by a sync generator 55.

The plate 21 may be considered divided into channels defined by the broken lines 61. The acoustic power coupled into each channel is controlled by the instantaneous light intensity on the element 33 at the end of the channel. The manifestation 11 is inserted a line at a time, through the elements 33. A continuously updated two-dimensional image propagates into the opto-acoustic medium 21, the entire manifestation just filling the length of the medium 21. The r.f. source is operated at a fixed frequency, $f$, and the opto-acoustic cell is illuminated by a coherent optical beam of wavelength $\lambda$; the acoustic pattern corresponding to the manifestation 11 is written with phase variations produced by the variations of acoustic intensity. A stationary pattern is achieved by strobing the incident light beam synchronously with the frame repetition.

It is desirable to suppress confusion of the image by reason of diffraction spread of each transducer 25. This is accomplished by limiting the length along the propagation of the acoustic pattern of plate 21 to avoid overlap of pattern elements as a result of diffraction spread. Typically assume that there are 100 elements 33 extending over a width along plate 21 of 2.5 centimeters. Each element typically has a length of $1.25 \times 10^{-2}$ cm. and the space between successive elements is typically $1.25 \times 10^{-2}$ cm. Assume that the frequency of the potential exciting the transducers 25 is typically 3 Gigahertz or $3 \times 10^9$ cycles per second and that the velocity of sound in the plate 21 is $3 \times 10^5$ cm/sec. The acoustic wavelength in plate 21 is then $(3 \times 10^5)/(3 \times 10^9)$ or $10^{-4}$ and the divergence of the beam is $10^{-4}/(1.25 \times 10^{-2})$ or $8 \times 10^{-3}$. The length of the plate is then given by $1.25 \times 10^{-2} = 8 \times 10^{-3}$ (tangent of an angle equals the angle for small angles)

$$=1.25/0.8 = 1.56 \text{ cm.}$$

This corresponds to a frame time of $1.56/3 \times 10^5 = 5.2 \times 10^{-6}$ or 5.2 microseconds, which is suitable for many high data rate applications.

While a photo-conductive array 37 has unique advantages in the practice of this invention, other modes of variation of impedance or resistance may be applied within the scope of the invention. Alternatively to modulating the resistance of a sensitive film area, as disclosed, its capacitance might be modulated, to perform the same function. In general, then, the complex impedance of the control film is made to govern the instantaneous acoustic level of the power impressed on an opto-acoustic medium 21.

While preferred embodiments of this invention have been disclosed herein, many modifications thereof are feasible. This invention is not to be limited except insofar as is necessitated by the spirit of the prior art.

I claim:

1. Display apparatus for producing a display of a manifestation including opto-acoustic medium means on which said display is to be produced, transducer means, variable impedance means coupling said transducer means in controlling relationship to said medium means, radio frequency driving means connected to said transducer means for driving said transducer means and means for varying the impedance of said variable impedance means in accordance with said manifestation to produce an acoustic pattern of said manifestation on said medium means, and means for impressing radiation on said medium means to convert said acoustic pattern into a visual display.

2. The apparatus of claim 1 for producing a display of a visual manifestation wherein the transducer means is a plurality of transducers each transducer coupled in independent controlling relationship to the medium and wherein the variable impedance means are an array of photo-conductive elements, a photo-conductive element coupled to each transducer, and wherein the impedance of the photo-conductive elements are varied in accordance with said manifestation by impressing on them optical radiation from the manifestation.

3. The apparatus of claim 2 wherein the array of photo-conductive elements is linear, the manifestation is scanned line by line and the optical radiation emitted by each scanned line in its turn is impressed in its turn on the array of photo-conductive elements.

4. The apparatus of claim 1 wherein means for impressing the radiation includes a laser source and the radiation is coherent.

5. The apparatus of claim 4 wherein the opto-acoustic image is produced periodically on the medium and the source is periodically energized at a period which is equal to an integral multiple of the period at which the image is produced.

6. The method of producing a display of a manifestation on an opto-acoustic medium with apparatus including transducer means driven by a radio frequency electrical potential coupled in opto-acoustic driving relationship with the medium; the said method comprising varying the impedance through which the transducer means drives the opto-acoustic medium in accordance with the manifestation to produce an acoustic pattern corresponding to said manifestation on said medium and impressing coherent optical radiation on said medium to convert said acoustic pattern into a visual pattern.

7. The method of claim 6 practiced with apparatus including an array of photo-conductive elements interposed in independent controlling relationship between the transducer means and the opto-acoustic medium and which includes the steps of scanning the manifestation, impressing the radiation from each scanned element in periodic succession on the elements and impressing the optical radiation periodically on the medium at a period equal to or a multiple of the period at which a complete acoustic pattern is produced on the medium driving each scanning cycle.

8. The apparatus of claim 1 including means connected to the opto-acoustic medium for suppressing reflection of the acoustic disturbance along said medium which produces the acoustic pattern.

9. The method of claim 6 including the step of suppressing reflection of the disturbance along the medium which produces the pattern.

* * * * *